(12) United States Patent
Hironaka et al.

(10) Patent No.: US 8,171,507 B2
(45) Date of Patent: May 1, 2012

(54) USING NETWORK SERVER TO ESTABLISH TV SETTING

(75) Inventors: Takashi Hironaka, San Diego, CA (US); Max Wu, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1098 days.

(21) Appl. No.: 12/040,262

(22) Filed: Feb. 29, 2008

(65) Prior Publication Data
US 2009/0219442 A1    Sep. 3, 2009

(51) Int. Cl.
*H04N 60/56* (2006.01)
(52) U.S. Cl. ............... 725/12; 725/9; 725/10; 725/132; 725/140; 725/152; 348/602; 348/603; 348/687; 348/688; 348/689
(58) Field of Classification Search .......... 348/602–603, 348/687–689; 725/9–10, 12, 132, 142, 152
See application file for complete search history.

(56) References Cited

U.S. PATENT DOCUMENTS

| | | | | |
|---|---|---|---|---|
| 5,532,848 A * | 7/1996 | Beretta | .......................... | 358/504 |
| 5,760,760 A * | 6/1998 | Helms | ............................ | 345/102 |
| 6,263,502 B1 * | 7/2001 | Morrison et al. | ................ | 725/47 |
| 6,530,083 B1 * | 3/2003 | Liebenow | ....................... | 725/46 |
| 6,804,827 B1 * | 10/2004 | Furukawa et al. | ............ | 725/140 |
| 6,862,022 B2 * | 3/2005 | Slupe | ............................ | 345/207 |
| 6,870,529 B1 * | 3/2005 | Davis | ............................. | 345/207 |
| 7,271,378 B2 * | 9/2007 | Cok | ......................... | 250/214 AL |
| 7,548,246 B2 * | 6/2009 | Huang et al. | ................... | 345/600 |
| 7,596,471 B1 * | 9/2009 | Beland et al. | ................. | 702/183 |
| 2001/0037504 A1 * | 11/2001 | Lee et al. | ......................... | 725/60 |
| 2003/0101451 A1 | 5/2003 | Bentolila et al. | | |
| 2004/0166840 A1 * | 8/2004 | Kawamura | ..................... | 455/419 |
| 2005/0036053 A1 * | 2/2005 | Marcu | ........................ | 348/333.1 |
| 2005/0097618 A1 * | 5/2005 | Arling et al. | ................... | 725/114 |
| 2005/0114891 A1 * | 5/2005 | Wasenius | ......................... | 725/62 |
| 2006/0090093 A1 | 4/2006 | Goedde et al. | | |
| 2007/0081101 A1 * | 4/2007 | Diederiks et al. | ............. | 348/602 |
| 2007/0162932 A1 | 7/2007 | Mickle et al. | | |
| 2007/0277203 A1 * | 11/2007 | Jung | ................................ | 725/46 |
| 2008/0024674 A1 * | 1/2008 | Park | .............................. | 348/687 |
| 2008/0301737 A1 * | 12/2008 | Hjelmeland Almas et al. | | 725/61 |
| 2009/0040091 A1 * | 2/2009 | Carlson et al. | ................. | 341/176 |

FOREIGN PATENT DOCUMENTS
EP        843230        11/2004

OTHER PUBLICATIONS

Steve Riedl, Paul Delzio; "Individually Targeted Advertising in a Switched Services Environment", http://www.bigband-networks.com/index.php/tech_whitepaper_ncta2.html.
Munjo Kim, Sanggil Kang, Munchurl Kim, Jaegon Kim, "Target Advertisement Service Using TV Viewers' Profile Inference", http://www.springerlink.com/content/y115916114144028/.

* cited by examiner

*Primary Examiner* — Jason Salce
(74) *Attorney, Agent, or Firm* — John L. Rogitz

(57) ABSTRACT

TV settings such as brightness can be established by sending from a TV signals from an ambient light sensor to a network server, with the network server establishing settings such as brightness in response for a program being played on the TV.

15 Claims, 2 Drawing Sheets

USING NETWORK SERVER TO ESTABLISH TV SETTING

FIELD OF THE INVENTION

The present invention relates generally to using a network server to establish a TV setting such as brightness.

BACKGROUND OF THE INVENTION

Televisions have become increasingly advanced, providing viewers with ever more control and viewing options. As but one example, electronic program guides (EPG) can be displayed on a TV in response to a command generated by a remote control device, with the EPG showing a channel listing and show descriptions. As another example, TV processors may execute code to control the drivers of TV displays for improving picture presentation.

As understood herein, attending the increasing complexity of TVs is the multiplying number of TV settings that a viewer can establish. As also understood herein, changing the TV settings can be confusing and cumbersome as a consequence. Many viewers thus leave the settings on their default values set in the factory. As a result, the TV might not produce its best performance.

SUMMARY OF THE INVENTION

A method includes sending from a TV signals representative of ambient light impinging on the TV. The method also includes receiving from a network server a signal representing an optimized display setting correlated to the ambient light, and then changing a current setting of the TV to the optimized display setting.

The setting can be brightness or some other setting such as contrast. The method may also include sending from the TV to the server an identification of a current audio-video program being displayed on the TV, with the optimized setting being based at least in part on the program identification. Still further, in some embodiments the method can include sending from the TV to the server an identification of a TV monitor associated with the TV, with the optimized setting being based at least in part on the monitor identification.

In another aspect, a TV includes a chassis, a TV processor in the chassis, and a TV display associated with at least one setting having a value. A light sensor is mounted to receive light impinging on the chassis. The light sensor communicates with the TV processor. The processor establishes the value of the setting based at least in part on information generated by the light sensor.

In still another aspect, a system has means on a TV chassis for displaying an audio video stream and means associated with the means for displaying for generating a signal representative of ambient light impinging on the means for displaying. A processor in the TV chassis sends the signal to a server on a wide area network. The processor executes logic to receive a setting value from the server and to apply the setting value to the means for displaying.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
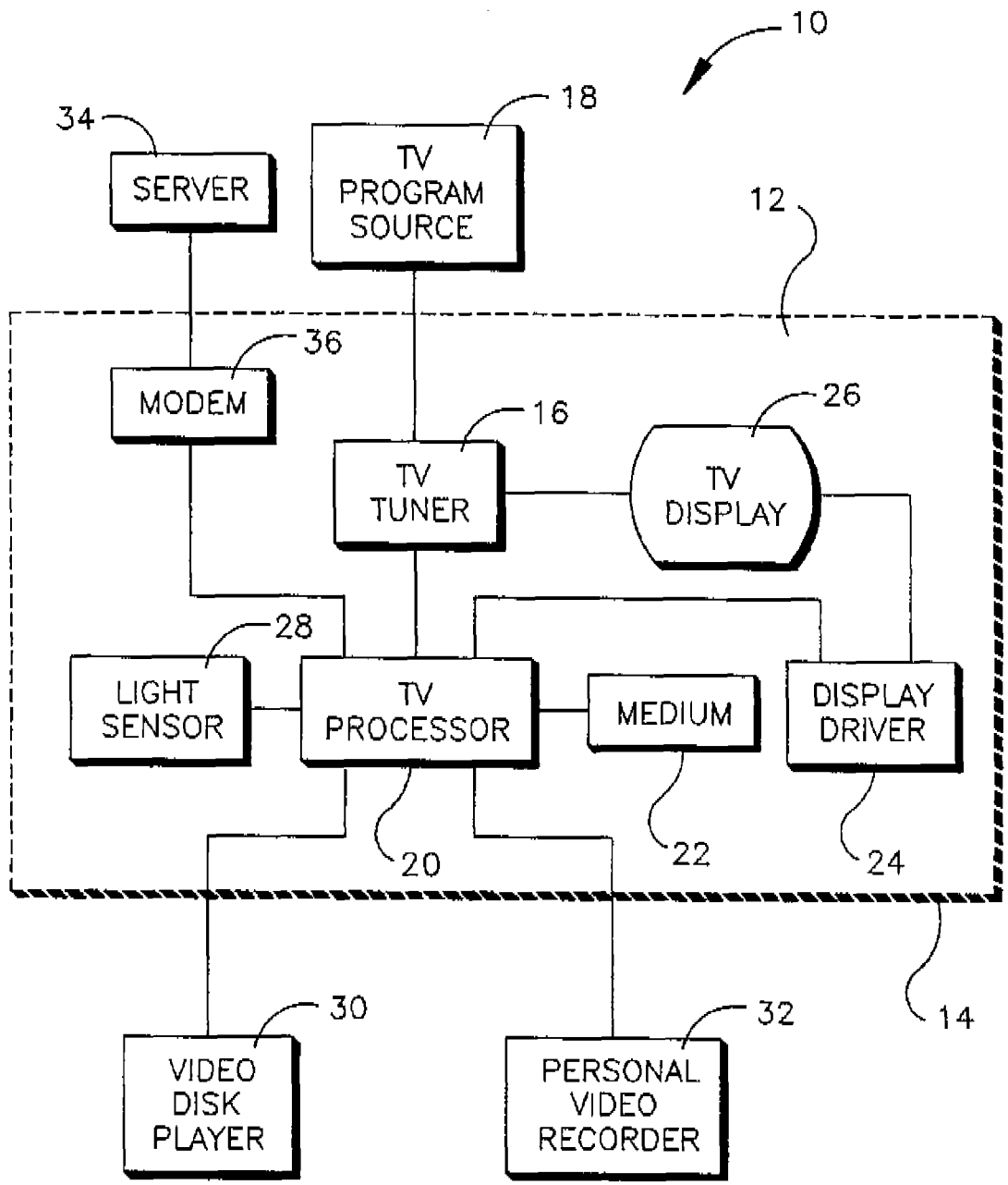
FIG. 1 is a non-limiting block diagram of a system in accordance with present principles.

Referring initially to FIG. 1, a system is shown, generally designated 10, which includes a television 12 defining a TV chassis 14 and receiving, through a TV tuner 16 from a set-top box (STB) or cable or satellite or other source or sources 18 audio video TV programming. The tuner 16 may be contained in the STB.

The TV 12 typically includes a TV processor 20 accessing a tangible computer readable medium 22. The tangible computer readable medium 22 may be established by, without limitation, solid state storage, optical or hard disk storage, etc. The medium 22 may store software executable by the TV processor 20 to, e.g., control a display driver 24 that drives a TV display 26 in accordance with one or more settings such as brightness, contrast, and the like that may be stored in, e.g., the medium 22. The display 26 may be a flat panel matrix display, cathode ray tube, or other appropriate video display. The medium 22 may also contain additional code including backend software executable by the TV processor 20 for various non-limiting tasks. The above-described processor may execute the logic below.

In the non-limiting embodiment shown in FIG. 1 the TV 12 may also include a light sensor 28 that sends a signal to the TV processor 20 representative of the ambient light impinging on the housing 14. The light sensor may be, without limitation, a photodiode, photoresistor, or phototransistor. The TV 12 may also receive programming from external components such as but not limited to a video disk player 30 such as a Blu-Ray or DVD player and a personal video recorder (PVR) 32 that can contain audio-video streams on a hard disk drive.

Additionally, the TV 12 can communicate via a network with a settings server 34. To this end, the TV 12 may incorporate a network interface such as but not limited to a modem 36 to communicate with the server 34 over the Internet. It is to be understood that the server 34 may be combined with the TV program source 18 when the source 18 is a remote entity accessible over a wide area network, in which case no modem need be provided, with the TV sending signals in accordance with the logic below through a reverse link to the source 18/server 34.

Figure 2:
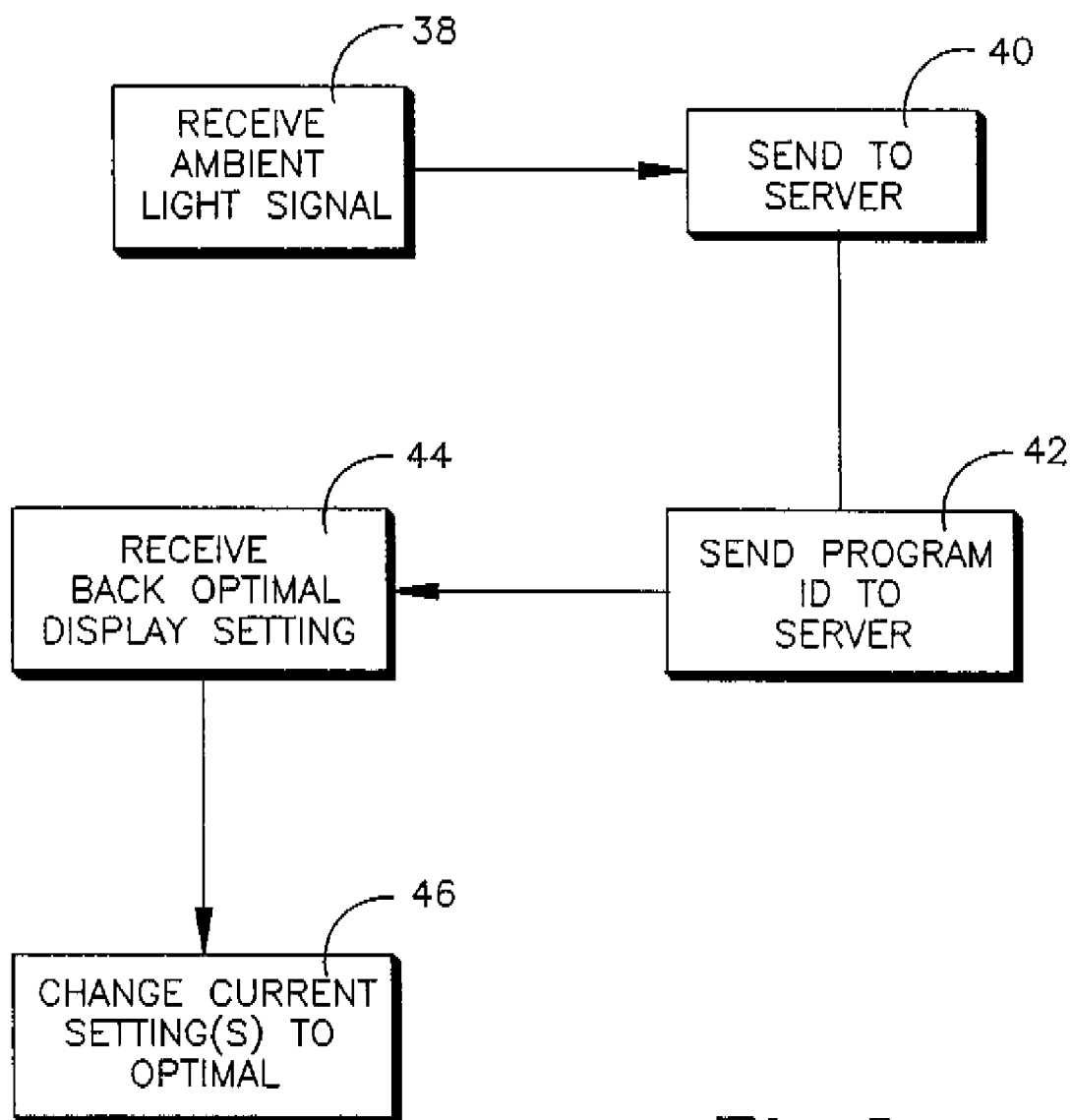
FIG. 2 is a flow chart of logic that may be employed by the system of FIG. 1.

Referring now to FIG. 2, at block 38 the ambient light signal from the light sensor 28 is received by the TV processor 20. The ambient light level is provided to the server 34 at block 40. Also the identification of the program currently being viewed, e.g., the title of an AV stream on a disk in the disk player 30, is also sent to the server at block 42. If desired, the display type is provided to the server as well. The TV processor 20 knows the program title from, e.g., metadata provided in the stream from the disk player 30 and it knows the display type by querying the display 26 or by other means known in the art. In this case of a TV program, the TV program information is obtained from PSIP, EPG, or Internet by the TV processor. In the case of pictures that are taken by a digital camera, the data used for taking the picture such as shutter speed or stop can be embedded to the picture file and used for adjusting the picture setting.

The server correlates the information provided as described above to generate optimal display settings, e.g., optimal brightness for the display 26. In one non-limiting embodiment the server 34 accesses a lookup table for the type of display and the current program which correlates ambient light levels to one or more corresponding display settings. These optimal setting(s) are received by the TV 12 at block 44.

Concluding at block 46, the current setting(s) of the TV display 44 are changed to be equal to the optimal settings received at block 44. For example, the brightness level being currently applied to the display 26 may be changed to a different value, i.e., the one received at block 44 from the server 34 based on the ambient light sensed by the sensor 28.

While the particular USING NETWORK SERVER TO ESTABLISH TV SETTING is herein shown and described in detail, it is to be understood that the subject matter which is encompassed by the present invention is limited only by the claims.

What is claimed is:

1. A method comprising:
   generating at a TV signals representative of ambient light impinging on the TV;
   generating at the TV an identification of a current audio-video program being displayed on the TV;
   receiving at least one signal representing an optimized display setting correlated to the ambient light and also correlated to the identification of a current audio-video program being displayed on the TV; and
   changing a current setting of the TV to the optimized display setting.

2. The method of claim 1, wherein the current setting is brightness.

3. The method of claim 1, wherein the program is from a disk player.

4. The method of claim 1, wherein the optimized display setting is based at least in part on an identification of the TV.

5. The method of claim 1, wherein the optimized display setting is based at least in part on both a TV identification and the identification of a current audio-video program being displayed on the TV.

6. A TV, comprising:
   a chassis;
   a TV processor in the chassis;
   a TV display associated with at least one setting having a value;
   a light sensor mounted to receive light impinging on at least a portion of the chassis, the light sensor communicating with the TV processor; wherein
   the processor establishes the value of the setting based at least in part on information generated by the light sensor, wherein the TV sends to a server an identification of a current audio-video program being displayed on the TV, an optimum value being based at least in part on the identification.

7. The TV of claim 6, wherein the information from the light sensor is sent to the server on a wide area network, the processor receiving from the server information relating to the optimum value for the setting.

8. The TV of claim 6, wherein the setting is brightness.

9. The TV of claim 6, wherein the program is from a disk player.

10. The TV of claim 7, wherein the TV sends to the server an identification of a TV monitor associated with the TV, the optimum value being based at least in part on the identification.

11. A system comprising:
    means on a TV chassis for displaying an audio video stream;
    means associated with the means for displaying for generating a signal representative of ambient light impinging on the means for displaying; and
    a processor in the TV chassis sending the signal to a server on a wide area network;
    the processor executing logic to receive at least one brightness value from the server and to apply the brightness value to the means for displaying, wherein the brightness value is based at least in part on an identification of the means for displaying.

12. The system of claim 11, wherein the brightness value is based at least in part on the signal.

13. The system of claim 11, wherein the brightness value is based at least in part on an identification of a current audio-video program being displayed by the means for displaying.

14. The system of claim 11, comprising a disk player providing the stream.

15. The system of claim 11, wherein the brightness value is based at least in part on the signal and on an identification of a current audio-video program being displayed by the means for displaying.

* * * * *